United States Patent
Aghssa et al.

(10) Patent No.: US 11,167,800 B2
(45) Date of Patent: Nov. 9, 2021

(54) SEAT SUPPORTING REINFORCEMENT BRACE

(71) Applicant: Ford Global Technologies, LLC, Dearborn, MI (US)

(72) Inventors: Peyman Aghssa, Ann Arbor, MI (US); Nikhil Mone, Dearborn, MI (US); Framroz Meheryar Bharucha, Farmington Hills, MI (US); John Michael McGuckin, Ann Arbor, MI (US); Sean Timothy Ryan, Farmington Hills, MI (US); Bin Zhang, Windsor (CA)

(73) Assignee: Ford Global Technologies, LLC, Dearborn, MI (US)

( * ) Notice: Subject to any disclaimer, the term of this patent is extended or adjusted under 35 U.S.C. 154(b) by 203 days.

(21) Appl. No.: 16/672,608

(22) Filed: Nov. 4, 2019

(65) Prior Publication Data
US 2021/0129910 A1  May 6, 2021

(51) Int. Cl.
*B62D 21/15* (2006.01)
*B62D 25/20* (2006.01)

(52) U.S. Cl.
CPC ....... *B62D 21/152* (2013.01); *B62D 25/2027* (2013.01)

(58) Field of Classification Search
CPC .. B62D 21/152; B62D 21/15; B62D 25/2027; B62D 25/2009
See application file for complete search history.

(56) References Cited

U.S. PATENT DOCUMENTS

| | | |
|---|---|---|
| 8,534,748 B1 | 9/2013 | Aghssa et al. |
| 8,708,401 B2 | 4/2014 | Lee et al. |
| 9,358,869 B2 | 6/2016 | Le Jaouen et al. |

FOREIGN PATENT DOCUMENTS

| | | | | |
|---|---|---|---|---|
| CN | 101489856 A | * | 7/2009 | ........... B62D 25/087 |
| CN | 203958311 U | | 11/2014 | |
| CN | 106985910 A | * | 7/2017 | ........... B62D 27/065 |
| DE | 102016010353 A1 | | 3/2018 | |
| JP | 2004330855 A | | 11/2004 | |
| JP | 2017132368 A | | 8/2017 | |
| WO | WO-2019043770 A1 | * | 3/2019 | ......... B62D 25/2036 |

OTHER PUBLICATIONS

Bowman, Chris, "Why Bracing Your Mustang's Chassis is Important," Mustang Chassis Bracing Guide, pp. 1-19, https://www.americanmuscle.com/mustang-chassis-bracing-guide.html.

(Continued)

*Primary Examiner* — Lori L Lyjak
(74) *Attorney, Agent, or Firm* — David Coppiellie, Esq.; Carlson, Gaskey & Olds, P.C.

(57) ABSTRACT

A vehicle having a reinforcement brace includes, among other things, an aft structure, a passenger side strut, a driver side strut, a passenger side load transfer frame coupling the aft structure to the passenger side strut and being configured to transfer a load applied to the aft structure from a rear of a vehicle to the passenger side strut, and a driver side load transfer frame coupling the aft structure to the driver side strut and being configured to transfer a load applied to the aft structure from the rear of the vehicle to the driver side strut.

19 Claims, 3 Drawing Sheets

(56) References Cited

OTHER PUBLICATIONS

"Build Thread Want to Blow 5 Years and $50k on a Foxbody? Step by Step Instructions Inside!" pp. 1-9, Nov. 13, 2011, https://www.stangnet.com.mustang-forums/threads/want-to-blow-5-years-and-50k-on-a-foxbody-step-by-step-instructions-inside.848816/page-7.

"Shop Confidently with Ultraracing," http://www.ultraracingshop.com/.

Bowman, Chris, "Why Bracing Your Mustang's Chassis is Important," Mustang Chassis Bracing Guide, pp. 1-19, retrieved on Sep. 11, 2019 from https://www.americanmuscle.com/mustang-chassis-bracing-guide.html.

"Shop Confidently with Ultraracing," retrieved on Sep. 11, 2019 from http://www.ultraracingshop.com/.

\* cited by examiner

SEAT SUPPORTING REINFORCEMENT BRACE

TECHNICAL FIELD

This disclosure relates generally to a brace of a vehicle and, more particularly, to a brace that can support a seat and help to redirect impact loads applied to the vehicle.

BACKGROUND

Vehicles can include structures designed to, in part, manage the kinematics of vehicle structures in response to an impact load applied to the vehicle.

SUMMARY

A vehicle having a reinforcement brace according to an exemplary aspect of the present disclosure includes, among other things, an aft structure, a passenger side strut, a driver side strut, a passenger side load transfer frame coupling the aft structure to the passenger side strut and being configured to transfer a load applied to the aft structure from a rear of a vehicle to the passenger side strut, and a driver side load transfer frame coupling the aft structure to the driver side strut and being configured to transfer a load applied to the aft structure from the rear of the vehicle to the driver side strut.

Another example of the foregoing vehicle includes a rear seat of the vehicle. The rear seat is directly coupled to the passenger side load transfer frame and the driver side load transfer frame.

In another example of any of the foregoing vehicles, the passenger side load transfer frame includes a first and a second support frame member that each extend longitudinally in a direction that is aligned with a longitudinal axis of the vehicle. The rear seat of the vehicle is directly attached to both the first support frame member and the second support frame member.

Another example of any of the foregoing vehicles includes a traction battery beneath the vehicle. The aft structure of the brace is aft the traction battery. The passenger side strut and the driver side strut both extend forward of the traction battery.

Another example of any of the foregoing vehicles includes a liquid fuel tank beneath the vehicle. The aft structure of the brace is aft the liquid fuel tank. The passenger side strut and the driver side strut both extend forward of the traction battery.

In an another example of any of the foregoing vehicles, the traction battery is on one of a passenger side or a driver side of the vehicle and the liquid fuel tank is on the other of the passenger side or the driver side.

In another example of any of the foregoing vehicles, the passenger side strut and driver side strut each extend to a position at least partially aligned with a B-pillar along the longitudinal axis.

In another example of any of the foregoing vehicles, the aft structure, the driver side load transfer frame, the passenger side load transfer frame, the driver side strut, and the passenger side strut are substantially elongated tubular structures.

In another example of any of the foregoing vehicles, the aft structure, the driver side load transfer frame, the passenger side load transfer frame, the driver side strut, and the passenger side strut are disposed atop a vehicle floor.

In another example of any of the foregoing vehicles, the aft structure is directly connected to a cross-brace. The cross-brace extends from the aft structure to connect to a driver side rail, and a passenger side rail of the vehicle.

In another example of any of the foregoing vehicles, the cross-brace is substantially X-shaped and configured to transfer impact energy during a rear impact experienced by the vehicle.

In another example of any of the foregoing vehicles, the cross-brace includes a portion extending on a passenger side of a spare tire compartment and a portion extending on a driver side of the spare tire compartment.

In another example of any of the foregoing vehicles, the vehicle is an electrified vehicle.

A vehicle reinforcement method according to another exemplary aspect of the present disclosure includes, among other things, providing a reinforcement brace having an aft structure that receives a load applied to a vehicle. The reinforcement brace is configured to direct the load outboard on a first side of the vehicle by directing the load from a passenger side of the aft structure to a passenger side load transfer frame and then to a passenger side strut that is outboard the passenger side of the aft structure. The reinforcement brace is configure to direct the load outboard on an opposite, second side of the vehicle by directing the load from a driver side of the aft structure to a driver side load transfer frame and then to a driver side strut that is outboard the driver side of the aft structure.

Another example of the foregoing method includes securing a rear seat of the vehicle directly to the passenger side load transfer frame and the driver side load transfer frame.

Another example of any of the foregoing method includes positioning the reinforcement brace within the vehicle relative to a traction battery of the vehicle such that the aft structure of the brace is aft the traction battery, and such that the passenger side strut and the driver side strut both extend forward of the traction battery.

Another example of any of the foregoing methods includes positioning the reinforcement brace within the vehicle relative to a liquid fuel tank of the vehicle such that the aft structure of the brace is aft the liquid fuel tank, and such that the passenger side strut and the driver side strut both extend forward of the traction battery.

Another example of any of the foregoing methods includes positioning the reinforcement brace within the vehicle such that the passenger side strut and the driver side strut each extend to a position at least partially aligned with a B-pillar along the longitudinal axis.

Another example of any of the foregoing methods includes directing the load from a cross-brace to the aft structure of the reinforcement brace, the cross-brace extending from the aft structure to connect to a driver side rail, and a passenger side rail of the vehicle.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure details an exemplary reinforcement brace for a vehicle. In particular, the disclosure details a reinforcement brace that helps to direct a load applied to the rear of the vehicle to the outboard areas of the vehicle. The reinforcement brace further directly supports a seat of the vehicle.

Figure 1:
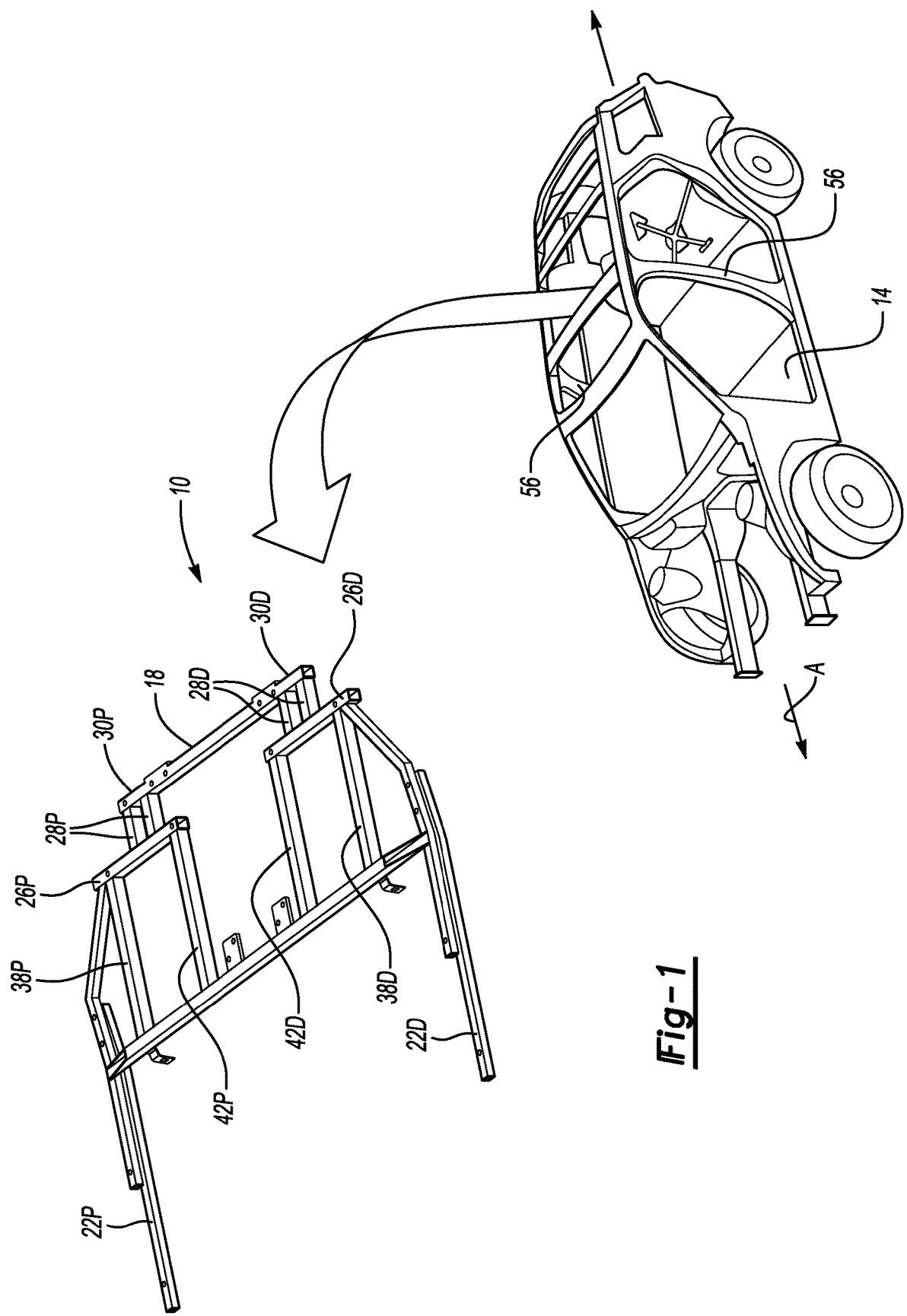
FIG. 1 shows a perspective view of a reinforcement brace and other portions of a vehicle body structure.

With reference to FIG. 1, a reinforcement brace 10, according to an exemplary aspect of the present disclosure, is disposed atop a vehicle floor 14. The reinforcement brace 10 and the vehicle floor 14 are parts of the vehicle body structure. The reinforcement brace 10 and the vehicle floor 14 can be secured together with mechanical fasteners, welds, or secured in some other way.

The reinforcement brace 10 includes an aft structure 18, a passenger side strut 22P, a driver side strut 22D, a passenger side load transfer member 26P, and a driver side load transfer member 26D.

A pair of connection members 28P extend from a passenger side end portion 30P of the aft structure 18 to the passenger side load transfer frame 26P. The connection members 28P extend longitudinally in a direction aligned with a longitudinal axis of the vehicle. The connection members 28P are spaced apart in a cross-vehicle direction.

The passenger side load transfer frame 26P is further directly coupled to the passenger side strut 22P. In the exemplary embodiment, a rear portion of the passenger side strut 22P extends beneath a portion of the passenger side load transfer frame 26P such that the passenger side load transfer frame 26P is stacked atop the passenger side strut 22P. Fasteners, welds, or some other attachment could be used to directly connect the passenger side load transfer frame 26P with the passenger side strut 22P.

A pair of connection members 28D extend from a driver side end portion 30D of the aft structure 18 to the driver side load transfer frame 26D. The connection members 28D extend longitudinally in a direction aligned with the longitudinal axis of the vehicle. The connection members 28D are spaced apart in a cross-vehicle direction.

The driver side load transfer frame 26D is further directly coupled to the driver side strut 22D. In the exemplary embodiment, a rear portion of the driver side strut 22D extends beneath a portion of the driver side load transfer frame 26D such that the driver side load transfer frame 26D is stacked atop the driver side strut 22D. Fasteners, welds, or some other attachment could be used to directly connect the driver side load transfer frame 26D with the driver side strut 22D.

Figure 2:
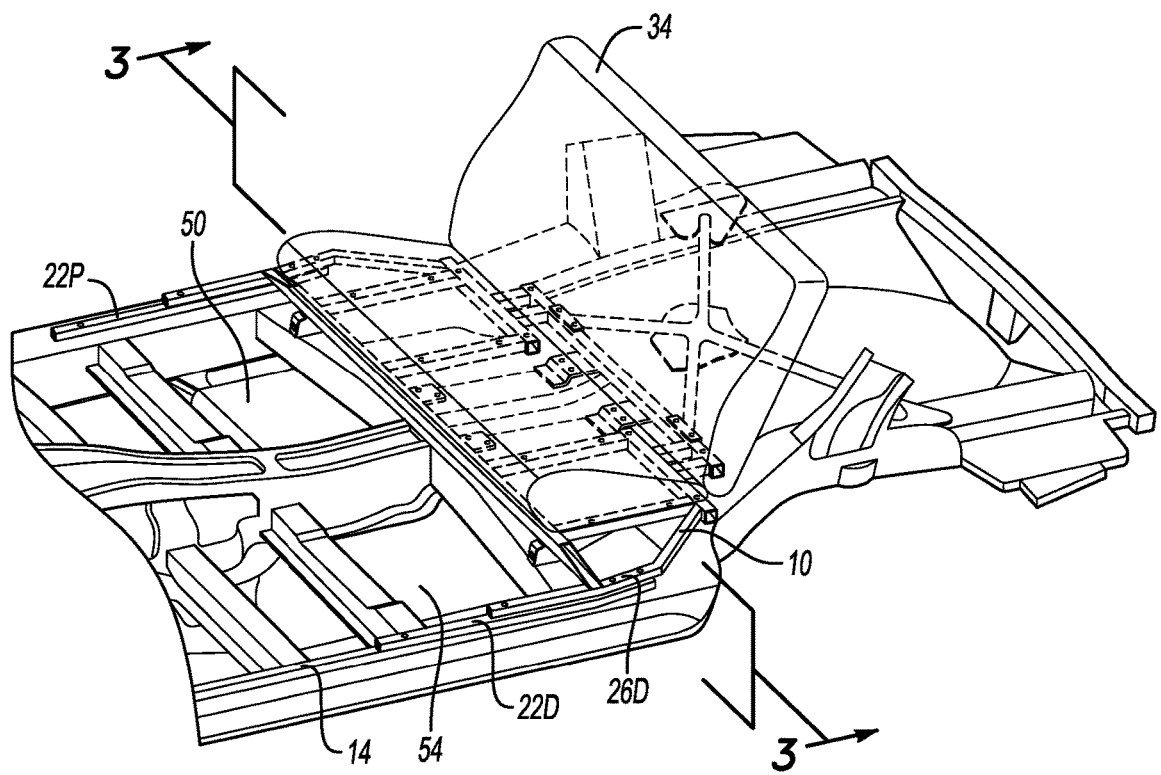
FIG. 2 shows a close-up view of the reinforcement brace when in an installed position within the vehicle and when supporting a rear seat structure of the vehicle.
Figure 3:
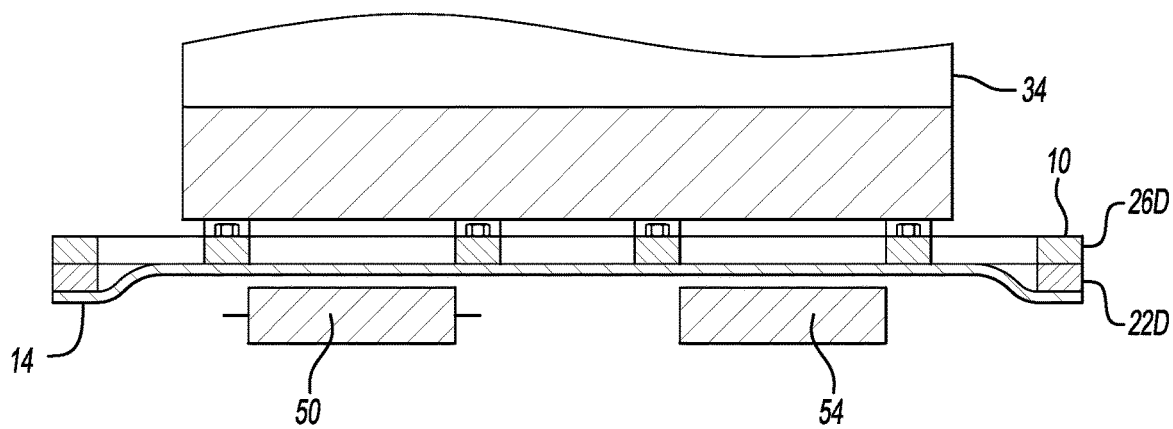
FIG. 3 illustrates a section view taken at line 3-3 in FIG. 2.

With reference now to FIGS. 2-3 and continued reference to FIG. 1, when the reinforcement brace 10 is installed within the vehicle, the reinforcement brace 10 rests atop the vehicle floor 14. A rear seat 34 of the vehicle is directly attached to the reinforcement brace 10 in the exemplary embodiment.

The driver side load transfer frame 26D includes, among other things, a first support frame member 38D and a second support frame member 42D. Similarly, the passenger side load transfer frame 26B includes a first support frame member 38P and a second support frame member 42P.

With reference to a longitudinal axis A of the vehicle, the first support frame members 38D and 38P are positioned outboard of the second support frame members 42D and 42P. The first support frame members 38D and 38P and the second support frame members 42D and 42P extend longitudinally in a direction aligned with the longitudinal axis A.

The rear seat 34 is directly attached to the first support frame members 38D, 38P, and the second support frame members 42D and 42P. Securing the rear seat 34 to the reinforcement brace can desirably help to control the kinematics of the rear seat 34 in response to a load.

Figure 4:
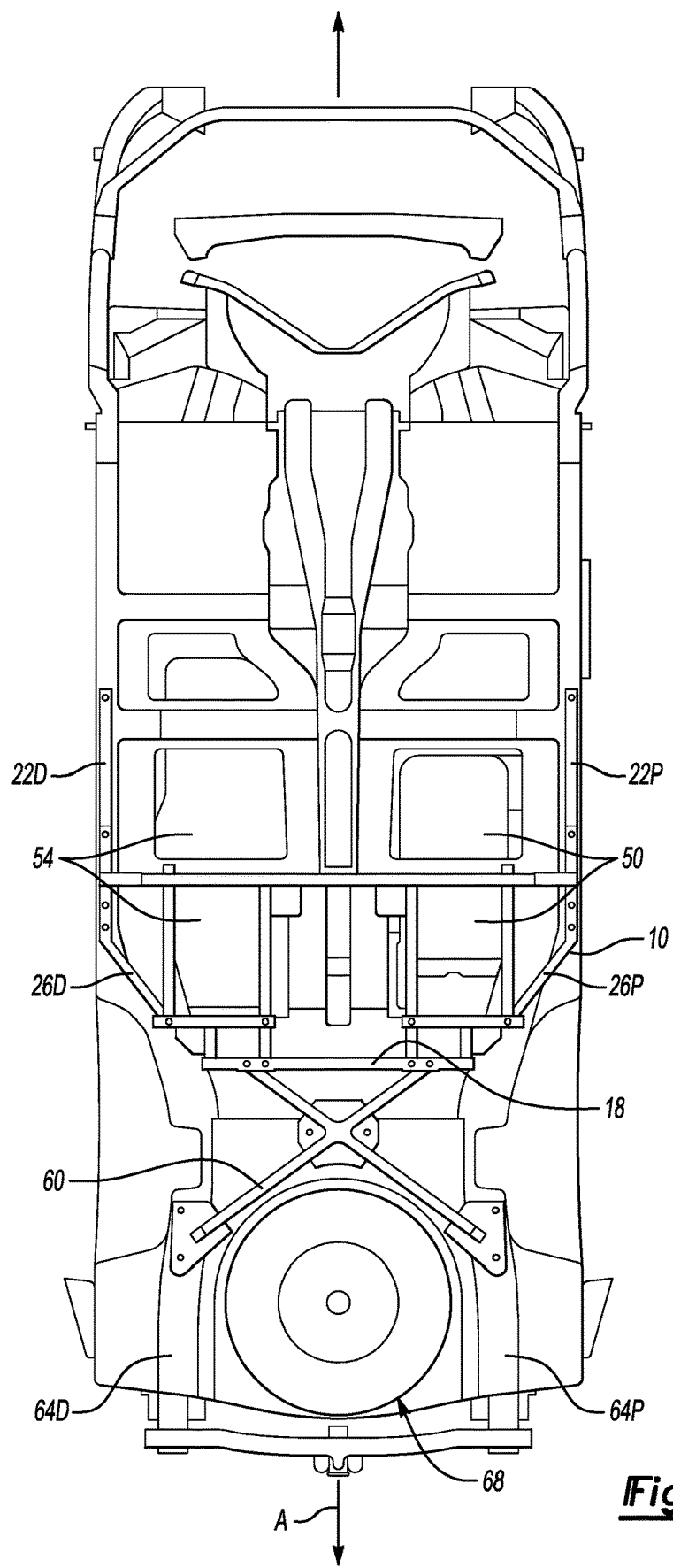
FIG. 4 illustrates a top view of the reinforcement brace and other selected portions of the vehicle.

With reference now to FIG. 4, the vehicle includes a traction battery 50 on a passenger side. The traction battery 50 is vertically beneath the reinforcement brace 10 and the vehicle floor 14. The vehicle further includes a liquid fuel tank 54 on a driver side of the vehicle. The liquid fuel tank 54 is vertically beneath the reinforcement brace 10 and the vehicle floor 14.

Vertical, for purposes of this disclosure, refers to the general orientation of the vehicle during operation or with reference to ground or horizon. In FIG. 4, for example, a vertically upward direction extends perpendicularly from a plane of the page.

Although the traction battery 50 is shown on the passenger side and the liquid fuel tank 54 on the driver side, the placement could be reversed in other examples such that the liquid fuel tank 54 is on the passenger side and the traction battery 50 is on the driver side.

In the exemplary embodiment, the vehicle having the reinforcement brace 10 is an electrified vehicle and, in particular, an electrified law enforcement vehicle. Electrified vehicles differ from conventional motor vehicles because electrified vehicles are selectively driven using one or more electric machines powered by a traction battery. The electric machines can drive the electrified vehicles instead of, or in addition to, an internal combustion engine. Example electrified vehicles include hybrid electric vehicles (HEVs), plug-in hybrid electric vehicles (PHEVs), fuel cell vehicles (FCVs), and battery electric vehicles (BEVs).

The exemplary traction battery 50 differs from a 12-Volt accessory battery of conventional vehicles because, among other things, the traction battery 50 can be used to provide motive power to drive wheels of the vehicle.

Along the longitudinal axis A, the aft structure 18 is positioned rearward of both the traction battery 50 and the liquid fuel tank 54. As a load is applied to the aft structure 18 from a rear of the vehicle, the load moves along a load path that passes from the aft structure 18 to the driver side load transfer frame 26D and the passenger side load transfer frame 26P.

The load transfer frames 26D and 26P are configured to redirect the load path outward away from the longitudinal axis A and along the respective driver side strut 22D and passenger side strut 22P. Vehicle structures at these laterally outward positions, such as rockers, can help to absorb the load moving along the load path.

The passenger side strut 22P and the driver side strut 22D each extend to a position that is at least partially aligned, along the longitudinal axis A, with a B-pillar 56 (FIG. 1). Extending the passenger side strut 22P and the driver side strut 22D this far forward in the vehicle can further help to absorb and disperse load moving along the load path by providing a substantially direct load path from the aft structure 18 to the B-pillars 56.

Directing the load outward away from the longitudinal axis A can lessen a concentration of load at a position aft of the traction battery 50 and aft of the liquid fuel tank 54. This can help to control kinematics of the vehicle structures in these areas and lessen relative movement of structures toward the traction battery 50 and the liquid fuel tank 54. Controlling the kinematics can help to avoid the vehicle structures, such as the subframe, contacting the traction battery 50, the liquid fuel tank 54, or both due to the impact load.

The aft structure 18, the driver side load transfer frame 26D, the passenger side load transfer frame 26P, the driver side strut 22D, and the passenger side strut 22P are substantially elongated tubular structures in this example. The tubular structures can have a wall thickness that is greater than 2.5 millimeters. In some examples, the wall thickness can be 3.0 millimeters. The structures can be secured together utilizing welds, for example, to provide the reinforcement brace 10. In this example, the reinforcement brace 10 is symmetrical about the longitudinal axis A of the vehicle 10. The symmetrical nature of the reinforcement brace 10 can facilitate directing offset impact loads.

The aft structure 18 is directly connected to a cross-brace 60 in the exemplary embodiment. The cross-brace 60 extends from the aft structure 18 rearward to connect to a driver side rail 64D and a passenger side rail 64P. The cross-brace 60 has a generally X-shaped configuration.

The portions of the cross-brace 60 extend along the driver side to a position that is on a passenger side of a spare tire compartment 68 within a trunk of the vehicle. The portions of the cross-brace 60 connected to the driver side rail 64D extend to a position on a driver side of the spare tire compartment 68.

When an impact load is applied to a rear of the vehicle, the load can, in the exemplary embodiment, initially move through the driver side rail 64D and the passenger side rail 64P into the cross-brace 60. From the cross-brace 60, the load is transferred to the aft structure 18 and then through the remaining portions of the reinforcement brace as previously described.

Although a specific component relationship is illustrated in the figures of this disclosure, the illustrations are not intended to limit this disclosure. In other words, the placement and orientation of the various components shown could vary within the scope of this disclosure. In addition, the various figures accompanying this disclosure are not necessarily to scale, and some features may be exaggerated or minimized to show certain details of a particular component.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. A vehicle having a reinforcement brace, the reinforcement brace comprising:
   an aft structure;
   a passenger side strut;
   a driver side strut;
   a passenger side load transfer frame coupling the aft structure to the passenger side strut and being configured to transfer a load applied to the aft structure from a rear of a vehicle to the passenger side strut; and
   a driver side load transfer frame coupling the aft structure to the driver side strut and being configured to transfer a load applied to the aft structure from the rear of the vehicle to the driver side strut.

2. The vehicle of claim 1, further comprising a rear seat of the vehicle, the rear seat directly coupled to the passenger side load transfer frame and the driver side load transfer frame.

3. The vehicle of claim 2, wherein the passenger side load transfer frame includes a first and a second support frame member that each extend longitudinally in a direction that is aligned with a longitudinal axis of the vehicle, wherein the rear seat of the vehicle is directly attached to both the first support frame member and the second support frame member.

4. The vehicle of claim 1, further comprising a traction battery beneath the vehicle, the aft structure of the brace aft the traction battery, the passenger side strut and the driver side strut both extending forward of the traction battery.

5. The vehicle of claim 4, further comprising a liquid fuel tank beneath the vehicle, the aft structure of the brace aft the liquid fuel tank, the passenger side strut and the driver side strut both extending forward of the traction battery.

6. The vehicle of claim 5, wherein the traction battery is on one of a passenger side or a driver side of the vehicle and the liquid fuel tank is on the other of the passenger side or the driver side.

7. The vehicle of claim 1, wherein the passenger side strut and driver side strut each extend to a position at least partially aligned with a B-pillar along the longitudinal axis.

8. The vehicle of claim 1, wherein the aft structure, the driver side load transfer frame, the passenger side load transfer frame, the driver side strut, and the passenger side strut are substantially elongated tubular structures.

9. The vehicle of claim 1, wherein the aft structure, the driver side load transfer frame, the passenger side load transfer frame, the driver side strut, and the passenger side strut are disposed atop a vehicle floor.

10. The vehicle of claim 1, wherein the aft structure is directly connected to a cross-brace, the cross-brace extending from the aft structure to connect to a driver side rail, and a passenger side rail of the vehicle.

11. The vehicle of claim 10, wherein the cross-brace is substantially X-shaped and configured to transfer impact energy during a rear impact experienced by the vehicle.

12. The vehicle of claim 10, wherein the cross-brace includes a portion extending on a passenger side of a spare tire compartment and a portion extending on a driver side of the spare tire compartment.

13. The vehicle of claim 1, wherein the vehicle is an electrified vehicle.

14. A vehicle reinforcement method, comprising:
   providing a reinforcement brace having an aft structure that receives a load applied to a vehicle, the reinforcement brace configured to direct the load outboard on a first side of the vehicle by directing the load from a passenger side of the aft structure to a passenger side load transfer frame and then to a passenger side strut that is outboard the passenger side of the aft structure, and to direct the load outboard on an opposite, second side of the vehicle by directing the load from a driver side of the aft structure to a driver side load transfer frame and then to a driver side strut that is outboard the driver side of the aft structure.

15. The vehicle reinforcement method of claim 14, further comprising securing a rear seat of the vehicle directly to the passenger side load transfer frame and the driver side load transfer frame.

16. The vehicle reinforcement method of claim 14, further comprising positioning the reinforcement brace within the vehicle relative to a traction battery of the vehicle such that the aft structure of the brace is aft the traction battery, and such that the passenger side strut and the driver side strut both extend forward of the traction battery.

17. The vehicle reinforcement method of claim 16, further comprising positioning the reinforcement brace within the vehicle relative to a liquid fuel tank of the vehicle such that the aft structure of the brace is aft the liquid fuel tank, and such that the passenger side strut and the driver side strut both extend forward of the traction battery.

18. The vehicle reinforcement method of claim 17, further comprising positioning the reinforcement brace within the vehicle such that the passenger side strut and the driver side strut each extend to a position at least partially aligned with a B-pillar along the longitudinal axis.

19. The vehicle reinforcement method of claim 14, further comprising directing the load from a cross-brace to the aft structure of the reinforcement brace, the cross-brace extending from the aft structure to connect to a driver side rail, and a passenger side rail of the vehicle.

* * * * *